United States Patent [19]

Wagener

[11] Patent Number: 4,727,220
[45] Date of Patent: Feb. 23, 1988

[54] APPARATUS FOR COVERING ELECTRICAL EQUIPMENT ATTACHED TO BUSBARS

[75] Inventor: Hans Wagener, Dietzholztal, Fed. Rep. of Germany

[73] Assignee: Rittal-Werk Rudolf Loh GmbH & Co. KG, Fed. Rep. of Germany

[21] Appl. No.: 6,528

[22] Filed: Jan. 23, 1987

[30] Foreign Application Priority Data

Jan. 23, 1986 [DE] Fed. Rep. of Germany ....... 3601988

[51] Int. Cl.$^4$ .................. H02B 1/06; H01R 13/44
[52] U.S. Cl. ........................ 174/5 R; 174/138 F; 361/355
[58] Field of Search .............. 174/5 R, 68 B, 70 B, 174/138 F; 361/341, 346, 347, 349, 355, 357, 360, 361; 439/113, 114, 135, 367, 718, 892, 893, 911, 933, 934

[56] References Cited

U.S. PATENT DOCUMENTS 3,560,632 2/1971 Wallace ........................... 174/138 F
3,778,682 12/1973 Bright ............................. 174/5 R X

FOREIGN PATENT DOCUMENTS

8511030 7/1985 Fed. Rep. of Germany ... 174/138 F

*Primary Examiner*—Laramie E. Askin
*Attorney, Agent, or Firm*—Thomas W. Speckman; Ann W. Speckman

[57] ABSTRACT

An apparatus for covering electrical equipment which is connected to busbars of a bus system and has a maximum structural height, and wherein the upper sides of the busbars are equidistantly spaced from the clamping faces of holders for receiving and firmly retaining the busbars. A universally applicable cover which is not attached to the individual pieces of electrical equipment, but is adapted to be affixed to the busbars, is provided in that the cover is in the form of a cap having a rectangular cross section and comprising a cover plate and side walls. One pair of side walls extends parallel to the busbars and has an internal height with respect to the cover plate which corresponds to at least the sum of the fastening distance and the structural height. The other pair of side walls projects past the outermost busbars of the bus system and is provided with cutouts at the side facing away from the cover plate, the depth of such cutouts perpendicular to the cover plate corresponding to the fastening distance. Attached to the inner side of the cover plate is at least one holding clamp for interaction with a busbar, with one clamping leg extending behind the busbar and embracing it.

36 Claims, 10 Drawing Figures

APPARATUS FOR COVERING ELECTRICAL EQUIPMENT ATTACHED TO BUSBARS

BACKGROUND OF THE INVENTION

1. Field of the Invention

The present invention relates to an apparatus for covering electrical equipment which is connected to the busbars of a bus system and has a maximum structural height, and wherein the upper sides of the busbars are equidistantly spaced from the clamping faces of holders for receiving and firmly retaining the busbars.

Bus systems having a plurality of bars extending in parallel are capable of having a great many electrical equipment units attached to the busbars, such electrical equipment comprising fuse holders, disconnecting switches, branch terminals and the like. To protect such electrical equipment from outside contact, it is desirable to provide it with a shock-proof cover.

2. Description of the Prior Art

A device for covering fuse holders is disclosed in German Utility Patent DE-GM No. 85 11 030. This prior art device comprises a box-shaped cover plate having a number of through-holes corresponding to the number of fuses. On the underside of the cover plate, guide ribs are arranged around the through-holes to enable the cover plate to be affixed to the screw socket of the fuse holder. Attached to the narrow sides of the cover plate are side plates which extend up to the clamping face of the holder for receiving and retaining the busbars. At their exposed edges facing the clamping face, the side plates are provided with break lines to facilitate the breaking out of cable inlet openings.

This well known cover device was created especially for fuse holders adapted to have fuses replaced without removing the cover.

In addition to fuse holders, other electrical devices may also be connected to the busbars which are not as easy to fit with a cover.

SUMMARY OF THE INVENTION

Accordingly, it is an object of the present invention to create a device of the type referred to above which is adapted to provide a shock-proof covering for a variety of different electrical devices without the need for such protective covering to be affixed to the individual electrical devices themselves.

This is accomplished according to the invention in that the cover is in the form of a cap-shaped structure of rectangular cross section and including a cover plate and side walls, that one pair of side walls extends parallel to the busbars and has an internal height with respect to the cover plate which corresponds to at least the sum of the fastening distance and structural height, that the other pair of side walls projects past the outermost busbars of the bus system and is provided with cutouts at the side facing away from the cover plate, the depth of such cutouts perpendicular to the cover plate corresponding to the fastening distance, that attached to the inner side of the cover plate is at least one holding clamp for interaction with a busbar, with one clamping leg extending across the busbar and embracing it in the rear thereof, and that the cutouts parallel to the cover plate are of a dimension which corresponds to the length measured from outer end to outer end of the outermost busbars plus an adjustment length which corresponds to at least the holding length of the clamping leg of the holding clamp.

The cover cap of the above construction is attached to the busbars and permits electrical equipment to be covered up to its maximum structural height which is measured from the upperside of the busbars. The side walls of the cap which extend in parallel with the busbars function to cover the bus system including the electrical devices connected thereto up to the clamping face of the holders. The side walls of the cap which extend perpendicular to the busbars extend up to the upper sides of the busbars and provide lateral covering for the electrical devices attached to the busbars. A cover cap of this particular construction is also suitable to cover blank spaces in the bus system where no equipment is connected to the busbars. The cover plate is adapted to be positioned in alignment flush with cover plates of adjacent caps. Thus, it is possible to provide shock-proof cover for a bus system over its entire length. The prior art cover for fuse holders may be integrally included in the cover means according to the invention if its maximum structural height is predetermined by the fuse holders.

According to one embodiment of the invention, the clamping leg is part of a U-shaped holding clamp, and the receiving space of the holding clamp has a width which is at least equal to the maximum thickness of the busbars. The receiving space surrounds the busbar at its top and bottom sides.

To mount the cover cap play-free on the busbars, another embodiment provides that the distance of the clamping leg of the holding clamp from the inner side of the cover plate is equal to the sum of the maximum structural height and the maximum thickness of the busbars, and that the clamping leg of the holding clamp is insertable in a press fit and/or force fit with the busbar. In this embodiment, the holding clamps may be formed in one piece on the cover cap.

A definitive attachment of the cover cap to the busbars is achieved according to another embodiment, in that the clamping leg is part of a U-shaped holding clamp, that the lateral leg opposite the clamping leg of the holding clamp is provided with a threaded bore, that the portion of the holding clamp between clamping leg and opposite leg having the threaded bore therein forms a receiving space for a busbar, the width of the receiving space being greater than the maximum thickness of the busbar, that the holding clamp is perpendicularly adjustably mounted with respect to the cover plate and is non-rotational, and that the threaded bore is adapted to receive a screw which is secured in the cover plate against axial displacement but is freely rotatable.

For the screw to be held captive in the cover plate, the screw is provided with a head which is countersunk in an indentation in the cover plate, and the screw is securely retained in the cover plate by means of a safety element inserted into an annular groove of the screw, while the non-rotatable mounting of the holding clamp is achieved by guide grooves provided in the lateral faces of the holding clamp which extend parallel to the cover side walls having the cutouts therein, the guide grooves being directed perpendicular to the cover plate and being adapted to interact with guide ribs formed on the inner surfaces of the side walls having the cutouts therein and/or on guide plates extending parallel to said side walls and perpendicular to the cover plate.

To enable adjustment of the holding clamp, according to another embodiment the holding clamp is provided with a threaded bore having a length which is greater than the width of the receiving space of the holding clamp, and the length of the screw threaded bolt is such that the threaded shank is still partially inserted in the threaded bore as the side leg opposite the clamping leg is placed against the upper surface of the busbar. This will also prevent an unintentional detachment of the holding clamp from the screw-threaded bolt as the cover cap is removed from the bus system.

If the screw threaded bolt has a length such that it is not yet completely inserted into the threaded bore when the clamping leg is placed against the underside of the busbar, then the screw is prevented from coming into contact with the bus so that, consequently, a metal screw may be used.

According to another embodiment, a definitive non-rotatable attachment of the cap is achieved in that each of the two outer busbars is associated with a holding clamp, and that the two holding clamps are positioned in the area of the side walls having cutouts therein.

The adjustment of the cap to conform to the clamping position of the holding clamps is facilitated in that the side walls with the cutouts are also provided with projections on the edges extending parallel to the cover plate to limit the extent of adjustment of the clamping legs of the holding clamps behind the busbars.

According to another embodiment, the electrical equipment covered by the cap according to the invention can be ventilated if the side walls of the cap extending parallel to the busbars are provided with ventilation slots adjacent the cover plate, which longitudinal slots extend preferably perpendicularly to the cover plate.

Connection of the electrical equipment covered by the cap is made possible in that the side walls extending parallel to the busbars are provided with rated break points for breaking out cable inlet openings which are open toward the free edge of the side walls.

Identification of the electrical equipment units thusly covered is achieved in an ingenious manner in that the outer surface of the cover plate is provided with a groove-like depression for insertion of an identification tape, the grooved depression extending parallel to the busbars.

If it is desired to cover with one and the same device also a bus system of the type wherein the two outer bus bars are adapted to be positioned at variable spacings, according to another advantageous embodiment, the cover cap may be divided along a center line of the side walls which are perpendicular to the busbars, to provide two identical half portions of the cap.

The two identical halves may be adapted to be joined together by means of the protective cover strips, the latter simultaneously serving to complete the cover plate between the two separating edges of the two halves connected together. The dimension of the cover cap perpendicular to the busbars may be varied approximately at a ratio of 1:2 if the construction is such that the cover strips perpendicular to the separating edge have a dimension which is smaller than the dimension of the cover plate perpendicular to the separating edge by an amount equal to the thickness of the side walls parallel to the separating edge.

If according to another embodiment, the halves are provided on the inner sides of their side walls extending perpendicularly to the separating edge and being provided over the one-half of their width without a cover strip with a guide rib directed perpendicular to the separating edge, the cover strips are provided along their outer longitudinal sides with side walls, and the outer surfaces of the side wall portions moved inwardly by an amount corresponding to the thickness of the side walls are provided with guide grooves for accommodating the guide ribs, then the side walls of the assembled cover cap extending perpendicularly to the busbars are completed regardless of the adjustment position of the halves.

A positive guidance during the installation procedure may be achieved when the guide ribs and the guide grooves have a matching T-shaped cross section, while the adjustment position of the cap halves is fixed by set screws which function to retain the guide ribs in their respective guide grooves.

To conform the holding clamps to variable spacings of the busbars, according to another embodiment the holding clamp is adapted to be insertable in various positions between the side walls of the cover cap and the guide plates, whereby the sides of the side walls, and the sides of the guide plates facing each other have formed thereon in mutual alignment a pluraltiy of guide ribs, and the cavity in the cover plate of the cap halves is elongate and provided with appropriate apertures.

BRIEF DESCRIPTION OF THE DRAWINGS

The invention will be further described with reference to an exemplary embodiment illustrated in the drawings, in which.

DESCRIPTION OF PREFERRED EMBODIMENTS

Figure 1:
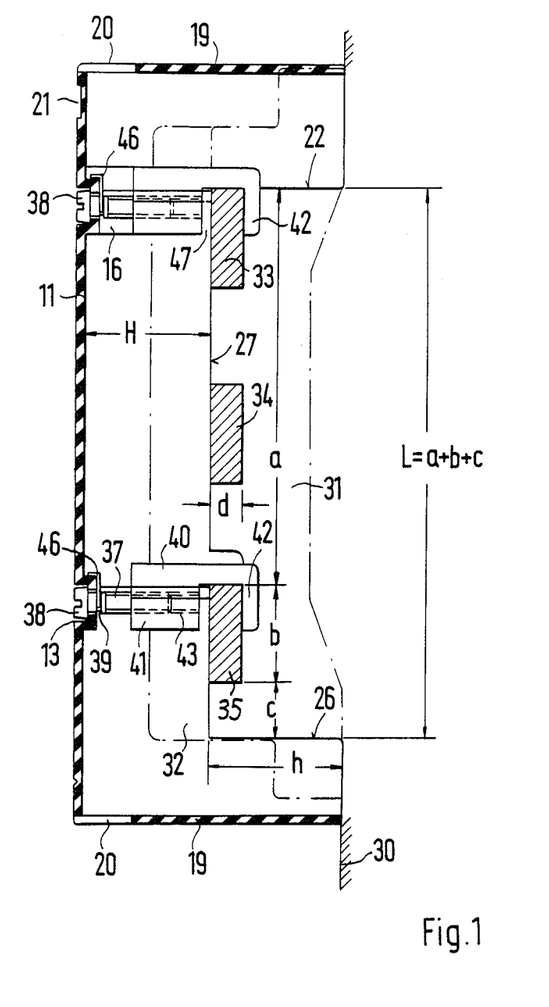
FIG. 1 is a vertical sectional view of the cover cap attached to the busbars.

Referring to FIG. 1, the illustrated embodiment shows three busbars 33, 34 and 35 of a bus system, which busbars are secured on clamping face 30 of a holder comprising a lower or bottom portion 31 and an upper or top portion 32. Busbars 33, 34 and 35 are equidistantly spaced in the holder so that their upper surfaces lie in a common plane at a distance (h) from clamping face 30. Busbars 33, 34 and 35 are adapted for the connection of a number of diverse electrical devices, provided such devices do not exceed a structural height (H). Structural height (H) may be the same as the height of the cover plate of the previously mentioned prior art cover for a fuse holder, for example.

Busbars 33, 34 and 35 may all have the same thickness (d) which may not exceed a maximum value. However, regardless of what the value of thickness (d) is, the use of inserts will ensure that the upper surfaces of busbars 33, 34 and 35 are always at a distance (h) from clamping face 30.

Figure 2:
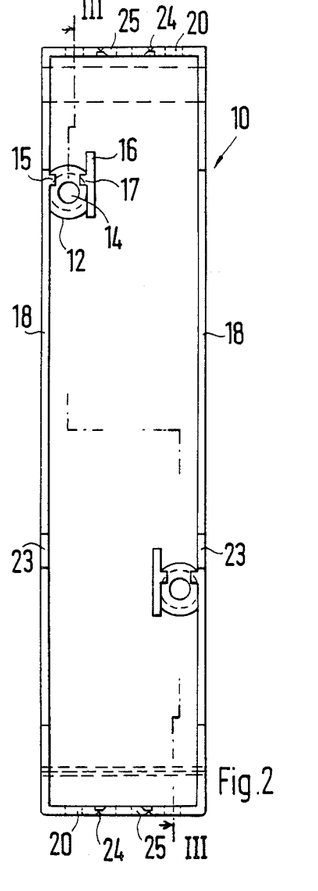
FIG. 2 is a top view of the inner side of the cap.
Figure 3:
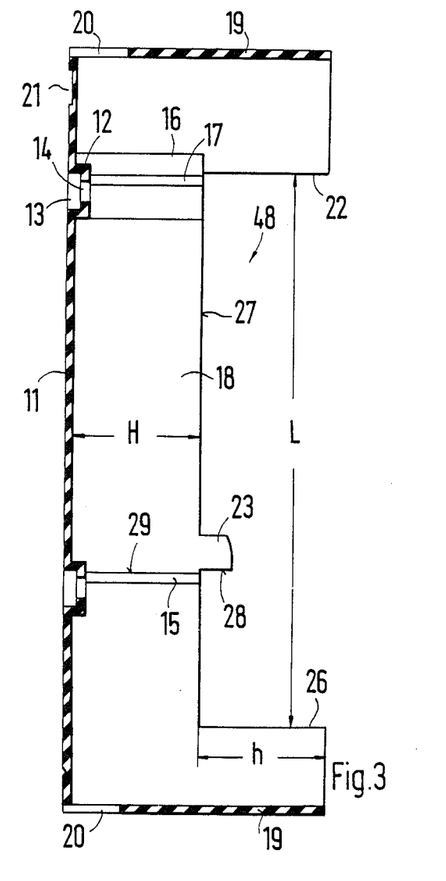
FIG. 3 is a sectional view of the cap taken along line III—III of FIG. 2.

As shown in FIGS. 2 and 3, the cover according to the present invention comprises an electrical insulating material cap 10 having a rectangular cross section and including cover plate 11 and side walls 18 and 19. Cap 10 is attached to the bus system in a manner such that side walls 19 extend parallel to busbars 33, 34 and 35. Provided in side walls 19 adjacent cover plate 11 are elongated slots 20 whose lengthwise dimension is directed perpendicular to cover plate 11. Side walls 19 are provided at their exposed sides facing clamping face 30 with discrete break points 24 for breaking out wall portions 25 to create cable inlet openings. The internal height of side walls 19 corresponds to the sum of the clamping distance (h) and the maximum structural height (H).

The outer side of cover plate 11 is provided with a recess or indentation 21 which also extends parallel to busbars 33, 34 and 35 and serves to receive an identification tape.

Side walls 18 are provided at the side facing away from cover plate 11 with flush retreating portions or cutouts 48. The depth of cutouts 48, as measured by edges 22 and 26 directed perpendicular to cover plate 11, corresponds to fastening distance (h). The length (L) of the cutout 48 extending parallel to cover plate 11 corresponds to the spacing (a) plus (b), measured from outer end to outer end of busbars 33 and 35, plus an allowance or free length (c).

Figure 4:
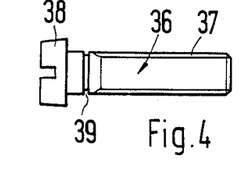
FIG. 4 shows, on an enlarged scale, a setscrew for engagement with the cover cap and adjustment of a holding clamp.

Cover plate 11 is provided with recesses 12 forming receptacles 13 for heads 38 of screws 36 shown in FIG. 4. A bore 14 extends through recess 12 in cover plate 11. Screw threaded bolt 36 has an annular groove 39 for receiving a safety element 46 provided on the interior surface of cover plate 11. In that way, screw 36 is held captive on cap 10. In this way, screw 36 is unable to move axially, but it is freely rotatable. The head of screw 36 may be countersunk in receptacle 13 of recess 12.

Figures 5, 6:
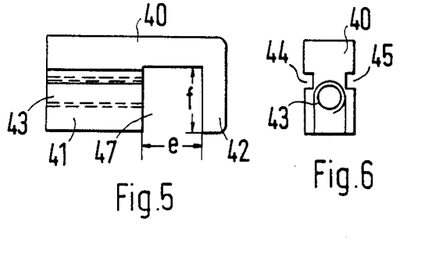
FIG. 5 is an enlarged side view of the holding clamp.
FIG. 6 is a front view of the holding clamp having a threaded bore therein.

Screw 36 may be inserted with its screw threaded portion 37 into threaded bore 43 in side leg 41 of holding clamp 40, as shown in FIGS. 5 and 6. Holding clamp 40 forms with its side leg 41 and its clamping leg 42 a receiving space 47 having a width (e) and a depth (f). Holding clamp 40 is adjustable toward and away from cover plate 11 by means of screw 36, while it is prevented from rotating due to the interaction of guide means comprising guide plate 16 and side wall 18 each provided with projections or guide ribs 15 and 17 being aligned opposite each other. Guide ribs 15 and 17 are directed perpendicular to cover plate 11 for interaction with guide grooves 44 and 45 in the side portions of holding clamp 40 and extending parallel to side walls 18. Holding clamps 40 may be inserted into the guides 16, 18 in a manner such that the receiving spaces 47 of all of holding clamps 40 are directed toward the same side wall 19.

Holding clamps 40 may be integrally or fixedly secured by their clamping legs 42 to the cap 10 if the clamping legs are spaced from the inner surface of cover plate 11 at a distance which is given by the sum of the maximum structural height (H) and the thickness (d) of busbars 33, 34 and 35.

If, however, busbars 33, 34 and 35 having different thicknesses are desired to be used within the bus system, then it is necessary for the distance of clamping legs 42 from cover plate 11 to be adjustable. This may be accomplished by the setscrew 36.

As shown in FIG. 1, clamping leg 42 of holding clamp 40 extends partially behind and around part of busbars 33, 34 and 35, fully utilizing the depth (f) of the receiving space 47. If the edge 22 of cutout 48 in side walls 18 is flush with the bottom of receiving space 47 of clamp 40 associated with busbar 33, then the free length or allowance (c) is determined by the depth (f) of receiving space 47. Cap 10 may then be moved from out of the fastened position shown in FIG. 1 upward a distance sufficient to expose clamping leg 42, and thereby enable the cap 10 to be pulled toward the front and removed. The space between the upper and the lower clamp 40 is selected to correspond to distance (a) defined by the two outer busbars 33 and 35. For the upper clamp 40, the side wall 18 having guide rib 15 thereon is used to serve as part of the guide means, while for the lower clamp 40, the other side wall 18 including guide rib 15 thereon forms part of the guide means for clamp 40.

A projection 23 having a lower surface 28 substantially flush with the upper surface 29 of guide rib 15 may be formed on the edge 27 of cutout 48 in each side wall 18 which, in combination with the lower busbar 35, serves to limit the movement of holding clamp 40 as it is being attached to busbars 33, 34 and 35. The width (e) of receiving space 47 of clamp 40 is somewhat greater than the maximum thickness (d) of busbars 33, 34 and 35. The threaded bore 43 is dimensioned so that in the fastening position according to FIG. 1, set screw 36 does not fully occupy the entire length of bore 43. This has the result that a metal screw 36 may be prevented from coming into contact with the busbar. Loosening screw 36 will effect an adjustment of clamp 40 away from cover plate 11 until the side leg 41 of clamp 40 is in engagement with the top surface of the busbar, while screw 36 continues to be partially inserted in threaded bore 43. Thus, clamp 40 is prevented from becoming detached from screw 36. If both screws 36 are loosened an amount sufficient to allow side legs 41 to abut the busbars, cap 10 may be moved upwardly a distance such that clamping legs 42 are exposed and cap 10 may be removed from the bus system by pulling it off toward the front.

The width of cap 10, that is, the length of side walls 19 which extend parallel to busbars 33, 34 and 35, may be set in relation to a predetermined modular dimension and may amount to a whole number multiple of such modular dimension. The modular dimension may be derived from the installation widths of the electrical equipment. Side walls 18 having cutouts 48 therein are primarily dimensioned to accommodate installation measurements of holders for the busbars.

Dividing box-shaped cover cap 10 according to FIG. 1 along the center line of side walls 18, which are perpendicular to the busbars, will provide two identical half portions of the cap. These halves of cover cap 10 may have different widths parallel to the busbars, as shown by the half portion 10' illustrated in FIGS. 7 and 8. Separating edge 60' extends parallel to side wall 19' provided with ventilation slots 20' and break points 24'.

Figure 7:
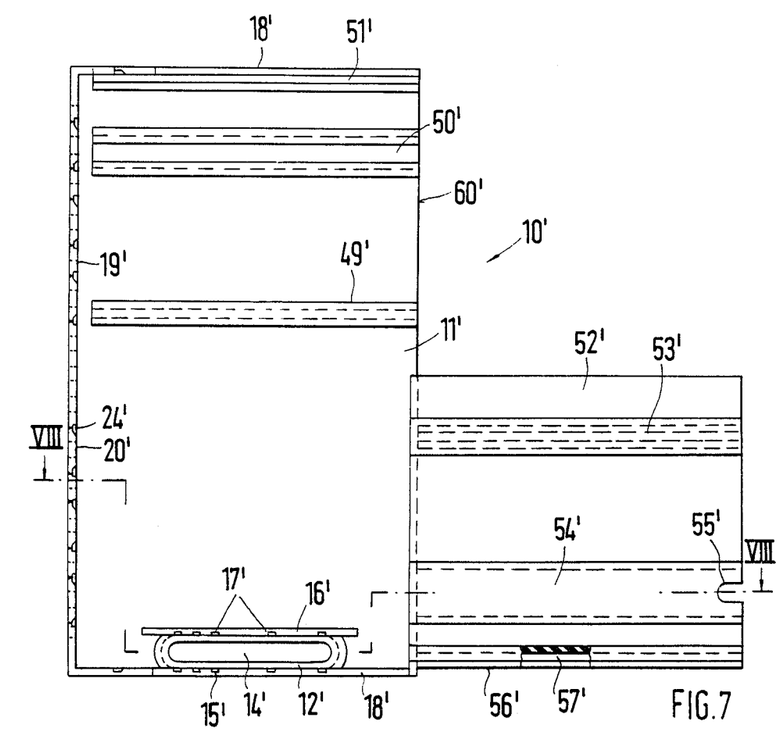
FIG. 7 is a view of the underside of one-half of the cover cap divided along a line parallel to the busbars to be covered.
Figure 8:
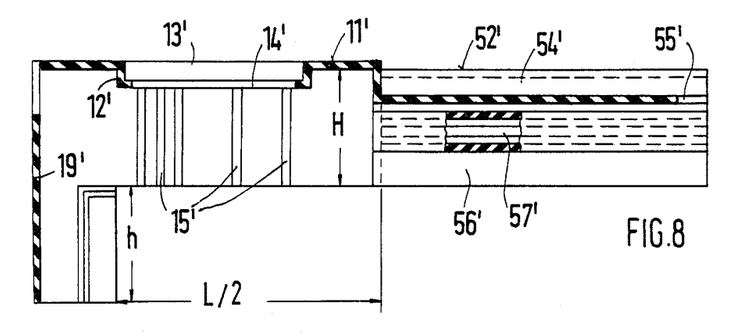
FIG. 8 is a longtiduinal sectional view of the cap taken along the line VIII—VIII of FIG. 7.

Recess 12' having an elongate slot 14' is designed to enable setscrew 36 for clamp 40 to assume different positions. Such positions are determined by guide ribs 15' provided on the inner side of side wall 18' and guide ribs 17' provided on guide plate 16'. Guide ribs 15' and 17' constitute pairs of ribs for interaction with the guide grooves of the holding clamp to enable the clamp to be movably adjusted to predetermined positions on cap half 10' in a direction perpendicular to cover plate 11'. In this manner, the holding clamps are able to conform to different spacings of the busbars.

Figure 9:
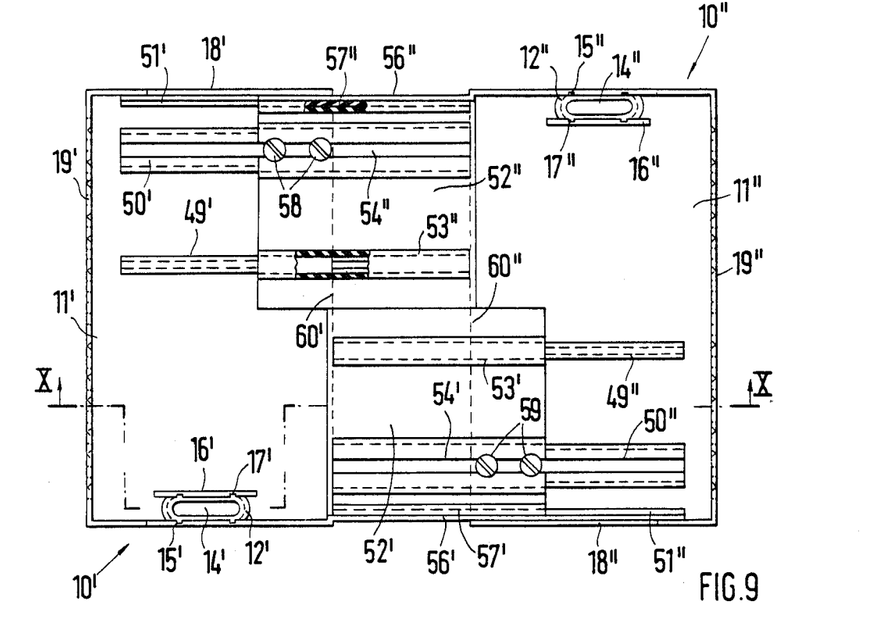
FIG. 9 is a view of the underside of a cover cap comprising two identical halves joined and fastened together.
Figure 10:
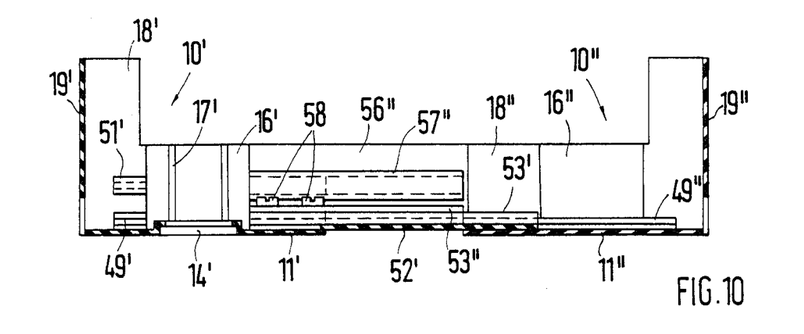
FIG. 10 is a longitudinal sectional view of the assembled cap taken along line X—X of FIG. 9.

Cover plate 11' extends over one-half of the length (L), as indicated in the drawing by L/2. In the area of separating edge 60', cover plate 11' is enlarged over half of the width by means of cover strip 52' by an amount equal to L/2 reduced by the thickness of side wall 19'. In addition, formed on the outer longitudinal edge of cover strip 52' is a side wall section 56' moved inward a distance corresponding to the thickness of side wall 18' and having the same height H. Indented in the upper surface of cover strip 52' are guide grooves 53' and 54' having a T-shaped cross section and directed perpendicular to separating edge 60'. The outer side of the side wall section 56' is provided with a similarly T-shaped guide groove 57'. Furthermore, the half portion 10' of the cap is provided on the inner side of cover plate 11', i.e., in the area of the cover plate that is without cover strip 52', with guide ribs 49' and 50' having a T-shaped cross section to match grooves 53" and 54" in the other identical half 10" of the cap, as shown in FIGS. 9 and 10. Side wall 18' of half portion 10' is provided on its inner side with guide rib 51' directed perpendicular to separating edge 60' and adapted to be slidably inserted into guide groove 57" of cap half 10". Cap half 10" is joined to cap half 10' by being rotated 180° to form a complete cover cap. In so doing, guide ribs 49", 50" and 51" of cap half 10" are insertable into grooves 53', 54' and 57' of the cap half 10', while guide ribs 49', 50' and 51' are inserted into guide grooves 53", 54" and 57" of the cap half 10". Halves 10' and 10" are slidably joined together until separating edges 60' and 60" abut. Cover strips 52' and 52" are displaced inwardly a distance equal to the thickness of cover plates 11' and 11", and along with side wall portions 56' and 56", are inserted into the interior space of the halves 10 and 10" so that they are in abutment with their inner surfaces. Halves 10' and 10" may be adjusted to the smallest perpendicular dimension relative to the busbars. The position of guide ribs 50' and 50" within guide grooves 54" and 54' is adjustable by means of setscrews 58 and 59. The free end of guide grooves 54' and 54" are provided with a receiving slot 55' for setscrews 58 and 59, respectively.

By pulling the two halves 10' and 10" apart upon loosening of setscrews 58 and 59, the dimension of the assembled cover cap perpendicular to the busbars may be varied as long as the guide ribs continue to be retained within the guide grooves and are arrestable. The dimension of cover strips 52' and 52" perpendicular to separating edges 60' and 60" is about the same as the measurement of cap halves 10' and 10", reduced by an amount equal to the thickness of side walls 19' and 19". Thus it is possible to adjust the cap to its smallest size, while in the other terminal position of halves 10' and 10", the size is almost doubled. The sections of cover strips 52' and 52" located between separating edges 60' and 60", including their side wall portions 56' and 56", serve to complete the assembled cap.

The screws for the holding clamps may be inserted into elongated apertures 14' and 14" provided in recesses 12' and 12" and are screwed into the holding clamps. The pairs of guide ribs 15' and 17' and 15" and 17" are effective to adjustably move the holding clamps into different positions perpendicular to the cover plate 11' or 11", respectively, in response to different spacings of the busbars.

I claim:

1. Apparatus for covering electrical equipment connected to a plurality of aligned busbars of a bus system and having a maximum structural height, and wherein the upper sides of the busbars are equidistantly spaced from the clamping faces of holders for receiving and retaining the busbars, characterized in that: said apparatus is in the form of a cap (10) having a rectangular cross section and comprising a cover plate (11) and two pairs of side walls (18, 19); a pair of first side walls (19) extends parallel to said busbars (33, 34, 35) and has an internal height with respect to said cover plate (11) which corresponds to at least the sum of a fastening distance (h) between the upper sides of said busbars and said clamping face and said structural height (H); a pair of second side walls (18) projects past the outermost busbars of said bus system and is provided with cutouts (48) at the side facing away from said cover plate (11), the depth of said cutouts (48) directed perpendicular to said cover plate (11) and corresponding to said fastening distance (h); at least one holding clamp (40) is attachable to the inner side of said cover plate (11) for interaction with at least one of said busbars (33, 34, 35), said holding clamp (40) having a clamping leg (42) extending across said busbar and abutting it in the rear thereof; and said cutouts (48) extend in a plane parallel to said cover plate (11) and are of a dimension which corresponds to a length (a)+(b) measured from outermost to outermost end of the outermost busbars, plus an adjustment length (c) which corresponds to at least an abutment length (f) of said clamping leg (42) of said holding clamp to one of said busbars.

2. Apparatus according to claim 1, characterized in that said holding clamp is generally U-shaped and has a receiving space (47) for accomodating a bus bar formed, in part, by said clamping leg (42), and said receiving space (47) of said holding clamp has a width (e) which equals at least a maximum thickness (d) of said busbars (33, 34, 35).

3. Apparatus according to claim 2, characterized in that the distance between said clamping leg (42) of said holding clamp (40) and the inner side of said cover plate (11) is equal to the sum of said maximum structural height (H) and said maximum thickness (d) of said busbars (33, 34, 35).

4. Apparatus according to claim 3, characterized in that said clamping leg (42) of said holding clamp (40) is contactable to at least one said busbar (33, 34, 35) by means of at least one of a press fit and a force fit.

5. Apparatus according to claim 2, characterized in that said holding clamp (40) has a lateral leg (41) opposite said clamping leg (42), said lateral leg (41) provided with a threaded bore (43); the space between said clamping leg (42) and the opposite said lateral leg (41) having said threaded bore therein forms said receiving space (47) for accommodating at least one said busbar (33, 34, 35), said width (e) being greater than said maximum thickness (d) of said busbar; said holding clamp (40) is perpendicularly adjustably mounted with respect to said cover plate (11) and is non-rotatable; and a screw (36) is mountable in said threaded bore (43) through said cover plate (11) in an axially non-displaceable but freely rotatable fashion.

6. Apparatus according to claim 5, characterized in that said screw (36) is provided with a head (38) and said cover plate (11) is provided with a recess (12) corresponding to said head (38); and said screw (36) has an annular groove (39) and is securely retainable on the inner side of said cover plate (11) of said cap (10) by means of a safety element inserted into said annular groove (39).

7. Apparatus according to claim 6, characterized in that guide grooves (44, 45) are provided in the lateral faces of said holding clamp (40) which extend parallel to said second side walls (18) having said cutouts (48) therein, said guide grooves (44, 45) are directed perpendicular to said cover plate (11); guide ribs (15, 17) are provided on the inner surfaces of said side walls (18) having said cutouts (48) therein and on guide plates (16) extending parallel to said second side walls (18) and being perpendicular to said cover plate (11); and said guide ribs (15, 17) are adapted to interact with said guide grooves (44, 45).

8. Apparatus according to claim 7, characterized in that said threaded bore (43) has a length which is greater than said width (e) of said receiving space (47) of said holding clamp (40), and the length of said screw (36) is such that its threaded portion (37) is still partially inserted in said threaded bore (43) when said lateral leg (41) opposite said clamping leg (42) is adjusted against the upper surface of said busbar (33, 34, 35).

9. Apparatus according to claim 8, characterized in that said screw (36) remains partially inserted in said threaded bore (43) when said clamping leg (42) is positioned against the lower surface of said busbar (33, 34, 35).

10. Apparatus according to claim 9, characterized in that each of the two outermost said busbars (33 and 35) is in contact with one said holding clamp (40), and said holding clamps (40) are mounted in the area of said second side walls (18) having said cutouts (48) therein.

11. Apparatus according to claim 10, characterized in that said second side walls (18) with said cutouts (48) therein are provided with projections (23) on edges (27) extending parallel to said cover plate (11), and said projections (23) are positioned to limit the adjustment of said clamping legs (42) of said holding clamps (40) by abutting said busbars (33, 34, 35).

12. Apparatus according to claim 11, characterized in that said first side walls (19) of said cap (10) extending parallel to said busbars (33, 34, 35) are provided with ventilation slots (20) adjacent said cover plate (11), said slots being longitudinal and extending perpendicular to said cover plate (11).

13. Apparatus according to claim 12, characterized in that said first side walls (19) extending parallel to said busbars (33, 34, 35) are provided with spaced break points (24) for furnishing cable inlet openings opening toward the free edge of said first side walls (19).

14. Apparatus according to claim 13, characterized in that the outer surface of said cover plate (11) is provided with a groove-like depression (21) in which an identification tape is insertable, said depression extending parallel to said busbars (33, 34, 35).

15. Apparatus according to claim 14, characterized in that said cap (10) is divided into two half portions (10', 10") along a line extending parallel to said busbars, and each said half portion includes a holding clamp (40); in the area of a separating edge (60', 60") of each said half portion (10', 10") a cover strip (52', 52") is provided which extends over one-half of the width of said cover plate (11', 11") and is displaced inwardly by an amount equal to the thickness of said cover plate (11', 11"); each said cover strip (52', 52") is provided with guide grooves (53', 54', and 53", 54") directed perpendicular to said separating edge; and said half portions (10', 10") are provided on the underside of said cover plates (11', 11") extending over one-half of the width without said cover strips (52', 52") with guide ribs (49', 50' and 49", 50").

16. Apparatus according to claim 15, characterized in that said cover strips (52', 52") perpendicular to said separating edges (60', 60") have a dimension which is smaller than the dimension of said cover plates (11', 11") perpendicular to said separating edges (60', 60") by an amount equal to the thickness of said first side walls (19) parallel to said separating edges (60', 60").

17. Apparatus according to claim 16, characterized in that said half portions (10', 10") are additonally provided with guide ribs (51', 51") on the inner sides of said second side walls (18', 18") extending perpendicular to said separating edge (60', 60") and being over one-half of their width without said cover strip (52', 52"); said cover strips (52', 52") are provided with side wall portions (56', 56") along their outer longitudinal sides, and the outer surfaces of said side wall portions (56', 56") are displaced by an amount corresponding to the thickness of said second side walls (18', 18") and are additionally provided with guide grooves (57', 57") for accommodating said guide ribs (51', 51").

18. Apparatus according to claim 17, characterized in that said guide ribs (49', 50', 51' and 49", 50 " and 51") and said guide grooves (53', 54', 57' and 53", 54" and 57") have a corresponding T-shaped cross section.

19. Apparatus according to claim 18, characterized in that the position of said two half portions (10', 10") with respect to one another is fixed by setscrews (58, 59) retaining said guide ribs (e.g., 50', 50") in the corresponding said guide grooves (e.g., 54", 54').

20. Apparatus according to claim 19, characterized in that said holding clamps (40) are insertable in various positions between said second side walls (18', 18") and said guide plates (16', 16"), whereby the sides of said second side walls (18', 18") and the sides of said guide plates (16', 16") facing each other have formed thereon in mutual alignment a plurality of guide ribs (15', 17'), and said recesses (12', 12") provided in said cover plates (11', 11") of said cap halves (10', 10") are elongate and are provided with apertures (14', 14").

21. Apparatus according to claim 1, characterized in that the distance between said clamping leg (42) of said holding clamp (40) and the inner side of said cover plate (11) is equal to the sum of said maximum structural height (H) and a maximum thickness (d) of said busbars (33, 34, 35).

22. Apparatus according to claim 1, characterized in that said holding clamp (40) is generally U-shaped and has a lateral leg (41) opposite said clamping leg (42), said lateral leg (41) provided with a threaded bore (43); that the space between said clamping leg (42) and the opposite said lateral leg (41) having said threaded bore therein forms a receptacle (47) for accommodating at least one said busbar (33, 34, 35), said receptacle (47) having a width (e) greater than a maximum thickness (d) of said busbar; said holding clamp (40) is perpendicularly adjustably mounted with respect to said cover plate (11) and is non-rotatable; and a screw (36) is mountable in said threaded bore (43) through said cover plate (11) in an axially non-displaceable but freely rotatable fashion.

23. Apparatus according to claim 22, characterized in that guide grooves (44, 45) are provided in the lateral faces of said holding clamp (40) which extend parallel to said second side walls (18) having said cutouts (48) therein, said guide grooves (44, 45) are directed perpendicular to said cover plate (11); guide ribs (15, 17) are provided on the inner surfaces of said side walls (18) having said cutouts (48) therein and on guide plates (16) extending parallel to said second side walls (18) and being perpendicular to said cover plate (11); and said guide ribs (15, 17) are adapted to interact with said guide grooves (44, 45).

24. Apparatus according to claim 22, characterized in that said threaded bore (43) has a length which is greater than said width (e) of said receptacle (47) of said holding clamp (40), and the length of said screw (36) is such that its threaded portion (37) is still partially inserted in said threaded bore (43) when said lateral leg (41) opposite said clamping leg (42) is adjusted against the upper surface of said busbar (33, 34, 35).

25. Apparatus according to claim 22, characterized in that said screw (36) remains partially inserted in said threaded bore (43) when said clamping leg (42) is positioned against the lower surface of said busbar (33, 34, 35).

26. Apparatus according to claim 1, characterized in that each of the two outermost said busbars (33 and 35) is in contact with one said holding clamp (40), and said holding clamps (40) are mounted in the area of said second side walls (18) having said cutouts (48) therein.

27. Apparatus according to claim 26, characterized in that said second side walls (18) with said cutouts (48) therein are provided with projections (23) on edges (27) extending parallel to said cover plate (11), and said projections (23) are positioned to limit the adjustment of said clamping legs (42) of said holding clamp (40) by abutting said busbars (33, 34, 35).

28. Apparatus according to claim 1, characterized in that said first side walls (19) of said cap (10) extending parallel to said busbars (33, 34, 35) are provided with ventilation slots (20) adjacent said cover plate (11), said slots being longitudinal and extending perpendicular to said cover plate (11).

29. Apparatus according to claim 1, characterized in that said first side walls (19) extending parallel to said busbars (33, 34, 35) are provided with spaced break points (24) for furnishing cable inlet openings opening toward the free edge of said first side walls (19).

30. Apparatus according to claim 1, characterized in that the outer surface of said cover plate (11) is provided with a groove-like depression (21) in which an identification tape is insertable, said depression extending parallel to said busbars (33, 34, 35).

31. Apparatus according to claim 1, characterized in that said cap (10) is divided into two half portions (10', 10'') along a line extending parallel to said busbars, and each said half portion includes a holding clamp (40); in the area of a separating edge (60', 60'') of each said half portion (10', 10'') a cover strip (52', 52'') is provided which extends over one-half of the width of said cover plate (11', 11'') and is displaced inwardly by an amount equal to the thickness of said cover plate (11', 11''); each said cover strip (52', 52'') is provided with guide grooves (53', 54', and 53'', 54'') directed perpendicular to said separating edge; and said half portions (10', 10'') are provided on the underside of said cover plates (11', 11'') extending over one-half of the width without said cover strips (52', 52'') with guide ribs (49', 50' and 49'', 50'').

32. Apparatus according to claim 31, characterized in that said half portions (10', 10'') are additionally provided with guide ribs (51', 51'') on the inner sides of said second side walls (18', 18'') extending perpendicular to said separating edge (60', 60'') and being over one-half of their width without said cover strip (52', 52''), said cover strips (52', 52'') are provided with side wall portions (56', 56'') along their outer longitudinal sides, and the outer surfaces of said side wall portions (56', 56'') are displaced by an amount corresponding to the thickness of said second side walls (18', 18'') and are additionally provided with guide grooves (57', 57'') for accommodating said guide ribs (51', 51'').

33. Apparatus according to claim 32, characterized in that said guide ribs (49', 50', 51' and 49'', 50'', 51'') and said guide grooves (53', 54', 57' and 53'', 54'' and 57'') have a corresponding T-shaped cross section.

34. Apparatus according to claim 31, characterized in that the position of said two half portions (10', 10'') with respect to one another is fixed by setscrews (58, 59) retaining said guide ribs (e.g., 50', 50'') in the corresponding said guide grooves (e.g., 54'', 54').

35. Apparatus according to claim 34, characterized in that said holding clamps (40) are insertable in various positions between said second side walls (18', 18'') and guide plates (16', 16''), whereby the sides of said second side walls (18', 18'') and the sides of said guide plates (16', 16'') facing each other have formed thereon in mutual alignment a plurality of guide ribs (15', 17''), and recesses (12', 12'') are provided in said cover plates (11', 11'') of said cap halves (10', 10''), said recesses are elongate and are provided with apertures (14', 14'').

36. Apparatus according to claim 31, characterized in that said holding clamps (40) are insertable in various positions between said second side walls (18', 18'') and guide plates (16', 16''), whereby the sides of said second side walls (18', 18'') and the sides of said guide plates (16', 16'') facing each other have formed thereon in mutual alignment a plurality of guide ribs (15', 17''), and recesses (12', 12'') are provided in said cover plates (11', 11'') of said cap halves (10', 10''), said recesses are elongate and are provided with apertures (14', 14'').

* * * * *